April 14, 1953     D. E. STAINTON     2,634,508
SCREW GAUGE

Filed Feb. 13, 1948     2 SHEETS—SHEET 1

Inventor
D. E. Stainton
By Glascot Downing Ratcliff
Attys

April 14, 1953     D. E. STAINTON     2,634,508
SCREW GAUGE
Filed Feb. 13, 1948     2 SHEETS—SHEET 2
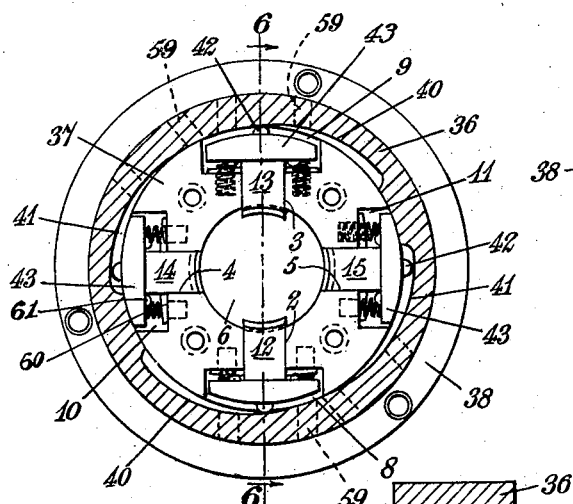
Fig.5.
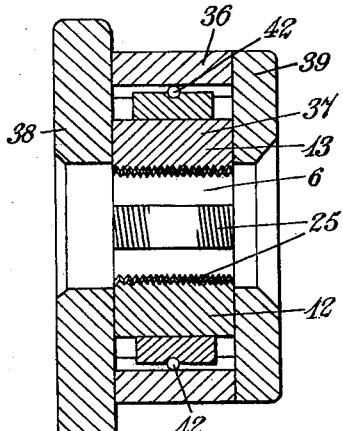
Fig.6.
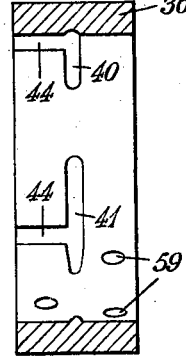
Fig.7.
Fig.8.
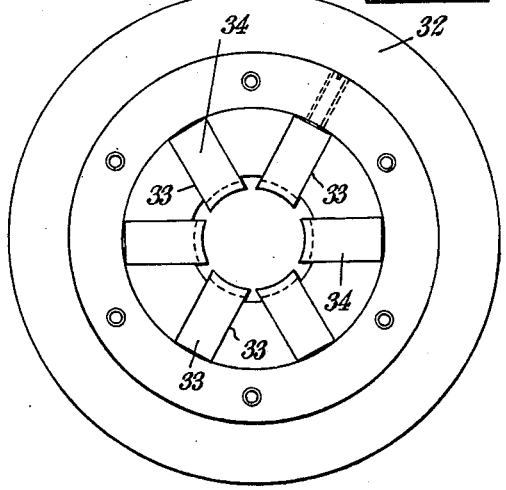
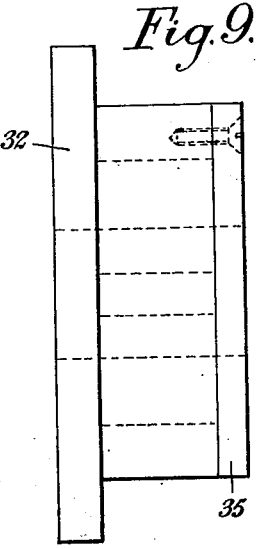
Fig.9.
Inventor
D. E. Stainton
By Glascock Downing Reekbd
Attys Patented Apr. 14, 1953

2,634,508

UNITED STATES PATENT OFFICE 2,634,508

SCREW GAUGE

Dudley Ernest Stainton, Rickmansworth, England, assignor of one-third to Harold George Carmichael Wilson and one-third to Harold James Haycock, both of Warwickshire, England Application February 13, 1948, Serial No. 8,231
In Great Britain October 9, 1943

Section 1, Public Law 690, August 8, 1946
Patent expires October 9, 1963

6 Claims. (Cl. 33—199)

This invention relates to screw gauges and has for its object to provide an improved ring gauge incorporating in one unit provision for testing the "go" full form and "not go" effective diameters and if desired "major diameter."

The invention consists in a screw gauge comprising a body portion having an axial aperture and radially displaceable gauging elements mounted in said body portion and adapted to be projected into said aperture against the action of spring means one set of elements providing a "go" gauge, and another set a "not go" gauge.

The screw gauge may comprise a body portion having an axial aperture, a circumferential series of axially extending grooves, radial slideways connecting the grooves with the axial aperture, and accommodating sets of radially displaceable gauging elements having cross-pieces lying within the grooves, recesses in the body portion opening to the grooves and accommodating coil springs which engage the cross pieces to hold the gauging elements normally in their outer positions.

In the accompanying drawings:

Figure 5 is an end elevation partly in section of a modification,

Figure 6 is a cross section on line 6—6 of Figure 5,

Figure 7 is a sectional elevation of the cam ring,

Figures 8 and 9 are views of a mounting for use in threading the gauging elements.

Figure 1:
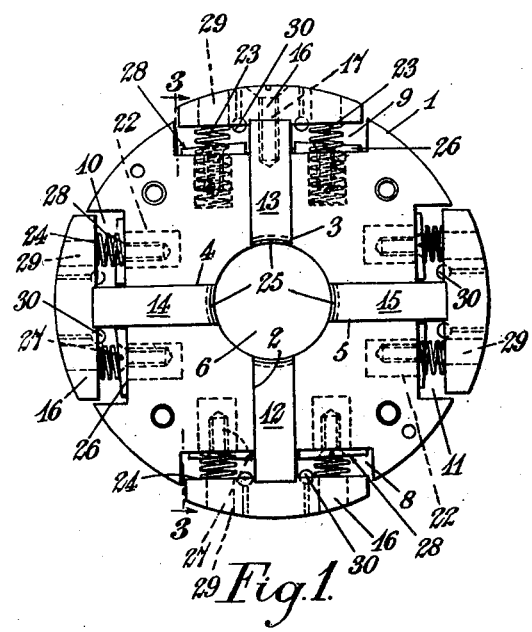
Figure 1 is an end view of the gauge with the face plate removed.

In carrying the invention into effect according to one convenient mode by way of example, see Figures 1 to 4, the gauge comprises a body member 1 which is provided with four slideways 2, 3, 4, 5. These slideways are arranged on diameters at right angles to one another and extend axially about one-half the length of the body 1. At their inner ends the slideways 2, 3, 4 and 5 open into an axial bore 6 which extends throughout the body, at one end being chamfered at 7. At their outer ends the slideways 2, 3, 4 and 5 open into peripheral grooves 8, 9, 10, 11 which are substantially wider than the slideways. The grooves extend throughout the length of the body. The inner base walls of the grooves are arranged at right angles to the slideways.

Located within the slideways 2, 3, 4 and 5 and slidable therein are gauging elements, 12, 13, 14 and 15, the elements 12 and 13 co-operate to form say the "go" gauge, while the elements 14 and 15 co-operate to form the "not go" gauge. Each gauging element is provided with a cross piece 16 all of which are of similar construction. The cross pieces 16 are accommodated within the grooves 8, 9, 10 and 11, and are secured to the gauging elements by screws 17 or in any other suitable way. The outer faces of the cross pieces conform to the circular shape of the body 1.

Endwise movement of the gauging elements is prevented by a cover plate 18 which is secured to the body 1 by screws 19.

The cover plate is provided with a central aperture 20, chamfered on its exterior end, which conforms to and is in alignment with the aperture 6 of the body 1. The cover plate 18 is provided with pins 21 which overlie an edge on each gauging element and limit their outward movement.

Located within the body 1 and opening to the inner base wall of the grooves 8, 9, 10, 11 are recesses 22 which accommodate coil springs 23. These springs abut against the inner faces 24 of the cross pieces 16 whereby they are normally thrust outward so that the inner gauging ends 25 of the gauging elements are located within the slideways and clear of the bore 6.

Inward movement of the gauging elements to the gauging position is controlled by adjustable setting means. According to the preferred arrangement each gauging element is provided with a pair of rotatable face cam washers 26 located on either side of the gauging element and secured to the body 1 by screws 27. The inclined cam faces 28 are adapted to be engaged by balls 30 secured in the cross piece 16. Clearance holes 29 are provided in the cross piece to enable the screws 27 to be operated when rotary adjustment of the cam washers 26 is required. The springs 23 and the cam washers 26 are obliquely disposed relatively to each other on opposite sides of each slideway.

The gauging faces 25 of the gauging elements are provided with appropriate threads according to the size of the gauge.

In operation, the gauge is passed over the screw to be tested and the gauging elements pressed inwardly by thumb and finger to bring the gauging faces into contact with the thread, the elements being used in pairs for "go" and "not go." In order to determine if the gauging elements are at their respective gauging positions, sighting apertures 31 are provided in the cover plate 18 by which it may readily be seen when the balls 30 are in contact with the cam washers thus providing both a feel and sight test.

The aperture 6 is adapted to serve as a plain ring gauge for the major diameter of the thread of the piece being tested and would thus reject threaded work whose major diameter is above nominal size. It will be obvious that the aperture 6 may be of a diameter larger than the major diameter of the thread in which case it would not serve as a gauging aperture.

The gauging elements may be prepared by being mounted in a threading fixture 32, see Figures 8 and 9, having a plurality of radial slots or recesses 33 in which the elements 34 are fixed by an end cover plate 35. The elements 34 would all be threaded as "go" or "not go" gauges and opposite elements would be utilised as pairs for inserting in the gauging body 1.

According to a modified arrangement, see Figures 5, 6 and 7, the inward movement of the gauging elements 12, 13, 14 and 15 may be effected by a rotary cam ring 36 mounted on the body 37 between an end flange 38 and a cover plate 39.

The cam ring is provided with a pair of cam surfaces or grooves 40 for the "go" gauging elements 12, 13 and an oppositely disposed and operating pair of cam surfaces or grooves 41 for the "not go" gauging elements 14, 15. The cam grooves co-operate with balls 42 mounted in the exterior surfaces of the gauging element bridge pieces 43. In order to mount the cam ring 36 in position, the cam grooves 40, 41 have axially extending entry grooves 44.

In use the cam ring 36 is moved in a forward or reverse direction according to the "go" or "not go" test being carried out. At an intermediate or neutral position of the cam ring, both pairs of gauging elements are located fully within their slideways leaving the major diameter aperture available for use.

Figure 2:
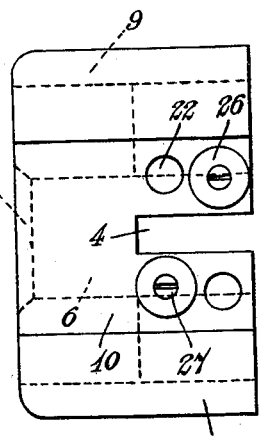
Figure 2 is a side view of the body of the gauge.
Figure 3:
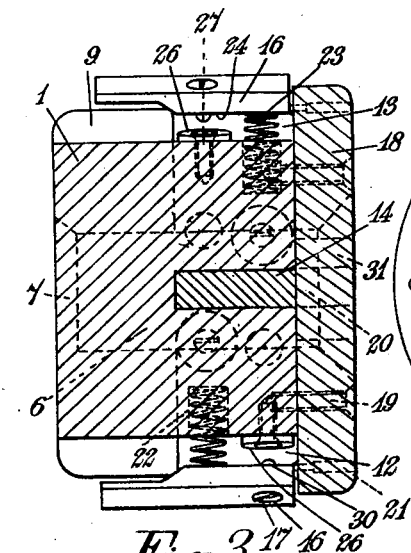
Figure 3 is a cross section at 3—3 of Figure 1 with the face plate in position.
Figure 4:
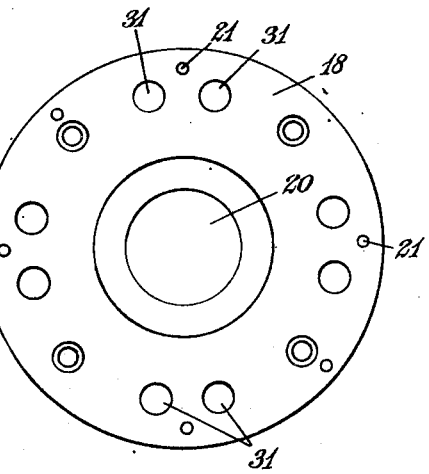
Figure 4 is a view of the end plate.

The cam ring 36 is provided with apertures 59 for the insertion of a screw driver to adjust face cam stops 60 similar to those shown at 26 Figures 1, 2 and 3, and with which balls 61 on the bridge pieces 43 are adapted to abut in a gauging operation.

It will be appreciated that the relative angular position of the cam ring 36 to move the gauging elements to their correct gauging position will be determined by the face cam stops 60.

I claim:

1. A limit screw ring gauge for testing "go" full form and "not go" effective diameters of screw threaded work pieces, comprising a body mounting of ring shape having a central aperture, a set of "go" gauging elements mounted in the body mounting for radial displacement relatively thereto, said gauging elements having inner end gauging formations movable by said displacement into said central aperture against the action of spring means, said gauging elements being angularly spaced around said body portion, a set of "not go" gauging elements mounted in the body portion for radial displacement relatively thereto, said "not go" gauging elements having inner end gauging formations movable by said displacement into said central aperture against the action of spring means, said "not go" gauging elements being spaced around said body mounting in alternate disposition with said "go" gauging elements, said "not go" gauging elements and said "go" gauging elements lying in substantially the same plane, and means whereby each set of gauging elements may be displaced into their gauging position without displacing the other set of gauging elements.

2. A limit screw ring gauge as claimed in claim 1, wherein said means comprise a rotatable cam ring mounted on the body mounting and surrounding the gauging elements, said elements being provided with balls on their outer extremities, said cam ring being provided with oppositely directed and operating cam surfaces adapted to engage the balls on the gauging elements, one set of cam surfaces cooperating with the balls on one set of gauging elements, the other set of cam surfaces cooperating with the balls on the other set of gauging elements.

3. A limit screw ring gauge as claimed in claim 1, wherein said means comprise surfaces operatively connected to the gauging elements and which are exposed to receive direct manual pressure to displace the gauging elements radially inward.

4. A limit screw ring gauge as claimed in claim 3 wherein adjustable stop means, one for each gauging element are provided, for limiting the inward movement of the element, each of said stop means comprising an adjustable face cam mounted in the body mounting with which an abutment operatively connected to the gauging element engages when the element is moved to its inner gauging position.

5. A limit screw ring gauge for testing "go" full form and "not go" effective diameter of screw threaded work pieces, comprising a body mounting having a central aperture, a circumferential series of axially extending grooves, radial slideways connecting said grooves with said aperture, a set of "go" gauging elements mounted in alternate slideways for radial displacement therein, a set of "not go" gauging elements mounted in the remaining slideways for radial displacement therein, said gauging elements having cross pieces located in said grooves, recesses in said body mounting opening to the grooves, coil springs in said recesses and engaging said cross pieces to hold the gauging elements in their outer positions, an end cover mounted on the body mounting to close the ends of said slideways, projections in said cover forming retaining stops for limiting the outward movement of said gauging elements, and means whereby each set of gauging elements may be displaced into their gauging position without displacing the other set of gauging elements.

6. A limit screw ring gauge as claimed in claim 5 wherein inward limit stops are provided for each gauging element comprising adjustable face cam washers at the bottom of said grooves, and balls mounted on the cross pieces adapted to engage the cam faces when the gauge element is moved to its gauging position.

DUDLEY ERNEST STAINTON.

References Cited in the file of this patent

UNITED STATES PATENTS

| Number | Name | Date |
|---|---|---|
| 1,169,327 | Hess | Jan. 25, 1916 |
| 1,307,451 | Parker | June 24, 1919 |
| 1,630,690 | Bosle | May 31, 1927 |
| 1,908,253 | Johnson | May 9, 1933 |
| 1,949,971 | Miller et al. | Mar. 6, 1934 |
| 2,239,981 | Terry et al. | Apr. 29, 1941 |
| 2,249,954 | Hellberg et al. | July 22, 1941 |
| 2,356,133 | Von Kieboom | Aug. 22, 1944 |
| 2,419,263 | Hohwart | Apr. 22, 1947 |
| 2,444,702 | Johnson | July 6, 1948 |

FOREIGN PATENTS

| Number | Country | Date |
|---|---|---|
| 113,536 | Great Britain | Feb. 28, 1918 |
| 303,544 | Germany | Feb. 5, 1918 |
| 575,995 | Great Britain | Mar. 14, 1946 |